United States Patent [19]
Shiba et al.

[11] Patent Number: 6,080,480
[45] Date of Patent: Jun. 27, 2000

[54] DELAYED-TACK ADHESIVE COMPOSITION

[75] Inventors: Kenichi Shiba; Yoshinobu Ishikawa; Masaki Nomura, all of Wakayama, Japan

[73] Assignee: Toyo Ink Manufacturing Co., Ltd., Tokyo, Japan

[21] Appl. No.: 09/043,650

[22] PCT Filed: Sep. 18, 1996

[86] PCT No.: PCT/JP96/02685

§ 371 Date: Mar. 25, 1998

§ 102(e) Date: Mar. 25, 1998

[87] PCT Pub. No.: WO97/12010

PCT Pub. Date: Apr. 3, 1997

[30] Foreign Application Priority Data

Sep. 25, 1995 [JP] Japan ................................ 7-246200

[51] Int. Cl.$^7$ .............................. B32B 33/00; C09J 11/08; C09J 123/20
[52] U.S. Cl. ................................ 428/355 R; 428/355 EV; 427/384; 156/327
[58] Field of Search ..................................... 428/346, 349, 428/355 R, 355 EN; 427/384, 385.5; 156/327

[56] References Cited

U.S. PATENT DOCUMENTS

| | | | |
|---|---|---|---|
| 4,745,026 | 5/1988 | Tsukahara et al. | 428/323 |
| 5,252,393 | 10/1993 | Kagota et al. | 428/349 |

FOREIGN PATENT DOCUMENTS

| | | |
|---|---|---|
| 0141504 | 5/1985 | European Pat. Off. . |
| 63-172784 | 7/1988 | Japan . |
| 6-57233 | 3/1994 | Japan . |
| 6-100848 | 4/1994 | Japan . |
| 07113067 | 5/1995 | Japan . |
| 07258616 | 10/1995 | Japan . |
| 1541560 | 3/1979 | United Kingdom . |
| 2103629 | 2/1983 | United Kingdom . |

*Primary Examiner*—Mark Kopec
*Attorney, Agent, or Firm*—Birch, Stewart, Kolasch & Birch, LLP

[57] ABSTRACT

A delayed-tack adhesive composition exhibiting a high tack strength even for adherends made of non-polar materials such as polyethylene and polypropylene, which comprises a (co)polymer prepared by the use of a radical-polymerizable monomer having a straight-chain or branched alkyl group having 9 to 18 carbon atoms and a plasticizer being solid at ordinary temperatures.

11 Claims, No Drawings

DELAYED-TACK ADHESIVE COMPOSITION

This application is the national phase under 35 U.S.C. § 371 of prior PCT International Application No. PCT/JP96/02685, which has an International filing date of Sep. 18, 1996, which designated the United States of America, the entire contents of which are hereby incorporated by reference.

BACKGROUND OF THE INVENTION

1. Field of the Invention

The present invention relates to a delayed-tack adhesive article having an adhesive layer which is non-tacky at ordinary temperatures but can develop tack by heating and is kept in a tacky state for a long time after the completion of the heating; and a delayed-tack adhesive composition useful for the production of the adhesive article.

2. Description of Related Art

A delayed-tack adhesive composition essentially comprises a thermoplastic polymer (or resin), a plasticizer being solid at ordinary temperatures, and optionally a tackifier. Among these components, the thermoplastic polymer serves as the basic component for developing tackiness and adhesiveness. On the other hand, the plasticizer is molten by heating to swell or soften the polymer, though it is solid at ordinary temperatures and hence cannot impart plasticity as it is to the polymer. In an adhesive article produced by the use of a composition comprising a thermoplastic polymer and a plasticizer being solid at ordinary temperatures, which exhibit the above properties respectively, the adhesive layer of the article is non-tacky at ordinary temperatures, but can develop tack by heating. Further, the tackifier serves to further improve the tack performance.

Up to this time, ethylene-vinyl acetate copolymers, styrene-butadiene copolymers and so on have occupied the mainstream of the thermoplastic polymer used in delayed-tack adhesive articles and delayed-tack adhesive compositions. These copolymers exhibit poor tack strength for adherends made of non-polar materials such as polyethylene, polypropylene and so on, though they exhibit relatively high tack for adherends made of polar materials such as glass, stainless steel and so on. Therefore, there was a problem that when an adhesive article having an adhesive layer comprising an ethylene-vinyl acetate copolymer or a styrene-butadiene copolymer was applied to an adherend made of such the non-polar material, the adhesive article peeled off the adherend within a short time after the application. Further, with respect to such an adhesive article, it has also been known that when the adhesive composition for forming the adhesive layer of the article takes some formulation, the resulting adhesive article is liable to cause blocking, though it is excellent in adhesiveness [see Japanese Patent Publication-A No. 63-172784 (published on Jul. 16, 1988)].

Under these circumstances, there have been proposed a delayed-tack adhesive excellent in tack characteristics and blocking resistance which comprises a thermoplastic resin (except ethylene-vinyl acetate copolymers) having a glass transition temperature of −5° C. or above, a crystalline plasticizer and a tackifier [see Japanese Patent Publication-A No. 56-57233 (published on Mar. 1, 1994)]; and another delayed-tack adhesive comprising a thermoplastic resin, a tackifier, a crystalline plasticizer and a colloid [see Japanese Patent Publication-A No. 6-100848 (published on Apr. 12, 1994)]. In the Examples of these patent documents, however, only stainless steel is used as the material of the adherend in the evaluation tests on adhesive strength and holding power, and therefore the above adhesives are still unknown in the adhesive strength and holding power for adherends made of non-polar materials. With respect to the thermoplastic resin as the adhesive component, on the other hand, the former document only stipulates that it must have a glass transition temperature of −5° C. or above and that it must be one other than ethylene-vinyl acetate copolymers. That is, both documents are silent on the detailed relationship between the kind of the thermoplastic resin and the kind of the material of the adherend.

As described above, there has not been found as yet any delayed-tack adhesive article which can be suitably applied even to an adherend made of a non-polar material and exhibits performances (such as tack, adhesiveness and blocking resistance) satisfactory enough for practical use. Actually, the use application of most of the labels which are each produced by coating a substrate with a delayed-tack adhesive composition and are put to practical use is limited to glass cases, and scarcely any such label applicable to plastic cases has been put to practical use. In other words, the delayed-tack adhesive article of the prior art produced by the use of the above thermoplastic resin had a problem that the use application thereof was limited because of the unpractically poor performance thereof for adherends made of plastics.

DISCLOSURE OF THE INVENTION

Summary of the Invention

The present inventors have extensively studied for solving the problems of the prior art. As a result of the studies, they have found that the use as the adhesive component of a thermoplastic (co)polymer prepared by using a radical-polymerizable monomer having a straight-chain or branched alkyl group having 9 to 18 carbon atoms as the starting monomer enables the preparation of an adhesive composition for delayed-tack adhesive articles which exhibits excellent tack even for adherends made of non-polar materials with initial tack and holding power comparable with those of the prior art. The present invention has been accomplished on the basis of this finding.

Thus, the present invention provides a delayed-tack adhesive composition comprising at least one member selected from the group consisting of (a) homopolymers each prepared from a radical-polymerizable monomer having a straight-chain or branched alkyl group having 9 to 18 carbon atoms, (b) copolymers each prepared from at least two radical-polymerizable monomers each having a straight-chain or branched alkyl group having 9 to 18 carbon atoms and (c) copolymers each prepared from at least one radical-polymerizable monomer having a straight-chain or branched alkyl group having 9 to 18 carbon atoms and at least one monomer copolymerizable therewith, and a plasticizer being solid at ordinary temperatures.

In other words, the present invention relates to a delayed-tack adhesive composition characterized by comprising a polymer of a radical-polymerizable monomer having an alkyl chain of 9 to 18 carbon atoms and/or a copolymer of said monomer and one or more monomer(s) copolymerizable therewith, and a solid plasticizer.

Further, the present invention provides a delayed-tack adhesive article comprising a substrate layer and an adhesive layer formed thereon comprising at least one member selected from the group consisting of (a) homopolymers each prepared from a radical-polymerizable monomer having a straight-chain or branched alkyl group having 9 to 18 carbon atoms, (b) copolymers each prepared from at least two radical-polymerizable monomers each having a straight-chain or branched alkyl group having 9 to 18 carbon atoms and (c) copolymers each prepared from at least one radical-polymerizable monomer having a straight-chain or branched alkyl group having 9 to 18 carbon atoms and at least one monomer copolymerizable therewith, and a plasticizer being solid at ordinary temperatures.

Furthermore, the present invention provides a process for preparing a delayed-tack adhesive article comprising the steps:

coating a substrate with the delayed-tack adhesive composition as described above, thereby obtaining an adhesive composition layer, and drying the adhesive composition layer.

In addition, the present invention provides use of at least one member selected from the group consisting of (a) homopolymers each prepared from a radical-polymerizable monomer having a straight-chain or branched alkyl group having 9 to 18 carbon atoms, (b) copolymers each prepared from at least two radical-polymerizable monomers each having a straight-chain or branched alkyl group having 9 to 18 carbon atoms and (c) copolymers each prepared from at least one radical-polymerizable monomer having a straight-chain or branched alkyl group having 9 to 18 carbon atoms and at least one monomer copolymerizable therewith for preparing a delayed-tack adhesive article or a delayed-tack adhesive composition.

The present invention will now be described in detail.

DETAILED DESCRIPTION OF THE INVENTION

In the present invention, a radical-polymerizable monomer having a straight-chain or branched alkyl group having 9 to 18 carbon atoms is used in the preparation of the homopolymers (a) and the copolymers (b) and (c). Examples of such the monomers include esters of (meth)acrylic acid with monohydric alcohols each having a $C_9$–$C_{18}$ linear alkyl group, specifically, acrylates such as nonyl acrylate, decyl acrylate, lauryl acrylate, tetradecyl acrylate, hexadecyl acrylate and stearyl acrylate, and methacrylates such as nonyl methacrylate, hexadecyl methacrylate and stearyl methacrylate; and esters of (meth)acrylic acid with monohydric alcohols each having a $C_9$–$C_{18}$ branched chain alkyl group prepared by e.g., the oxo process or the Ziegler process. The above-described monohydric alcohol having a $C_9$–$C_{18}$ branched chain alkyl group is generally a mixture of alcohols having various branched alkyl groups. Further, examples of the monomers described above also include vinyl esters such as vinyl laurate and vinyl stearate; vinyl ethers such as lauryl vinyl ether and stearyl vinyl ether; and amides such as N-dodecylacrylamide and N-octadecylacrylamide. Furthermore, examples of the monomers described above also include derivatives of acrylic and methacrylic acids each having a long-chain alkyl group, such as 2-octadecanoyloxyethyl acrylate, 2-(N-octadecylcarbamoyloxy)ethyl acrylate, 2-(N-hexadecylcarbamoyloxy)ethyl acrylate, 2-[N-(octadecyloxycarbonyl)amino]ethyl methacrylate, N-(2-octadecanoyloxy)ethylacrylamide, N-(2-octadecanoyloxy)ethylmethacrylamide and N-octadecyl-N'-(2-acryloyloxy)ethylurea. Among these monomers, esters of (meth)acrylic acid with monohydric alcohols each having a $C_9$–$C_{18}$ linear alkyl group are preferred. In the present invention, one of these monomers is used for preparing the homopolymer (a), and two or more of them are used for preparing the copolymer (b).

The monomer which is copolymerizable with the above monomer and is used in the preparation of the copolymer (C) is not limited at all, as long as it is copolymerizable therewith. Examples thereof include vinyl halides such as vinyl chloride; vinyl esters such as vinyl acetate, vinyl propionate, vinyl butyrate and vinyl benzoate; vinyl ethers such as vinyl propyl ether and vinyl butyl ether; acrylates such as methyl acrylate, ethyl acrylate, butyl acrylate, 2-ethylhexyl acrylate, 2-hydroxyethyl acrylate and glycidyl acrylate; methacrylates such as methyl methacrylate, ethyl methacrylate, butyl methacrylate, 2-hydroxyethyl methacrylate and glycidyl methacrylate; acids each having an unsaturated double bond such as acrylic acid and methacrylic acid; amides each having an unsaturated double bond such as acrylamide, methacrylamide and diacetone acrylamide [i.e., N-(1,1-dimethyl-2-acetoethyl)acrylamide]; aromatic vinyl compounds such as styrene and vinyltoluene; heterocyclic vinyl compounds such as vinylpyrrolidone and vinylpyridine; nitrites each having a vinyl group such as acrylonitrile and methacrylonitile; allyl compounds such as allyl glycidyl ether; and crosslinking compounds each having a plurality of reactive vinyl groups such as divinylbenzene. In the present invention, at least one member of these monomers is used in the preparation of the copolymer (C)

The homopolymers (a) and copolymers (b) and (c) according to the present invention are excellent in the wetting of the surface of an adherend made of a non-polar material, as compared with the (co)polymers each prepared by (co)polymerizing a monomer(s) having an alkyl group having 8 or less carbon atoms, consequently enhancing the tack strength of the adhesive article according to the present invention.

Among the homopolymers (a) and the copolymers (b) and (c), it is preferable to use at least one of the copolymers (c) in the present invention. Further, it is still preferable to use a copolymer (c) prepared by copolymerizing 30 to 70% by weight of at least one radical-polymerizable monomer having a straight-chain or branched alkyl group having 9 to 18 carbon atoms with 70 to 30% by weight of at least one monomer copolymerizable therewith, each percentage being based on the total weight of the monomers.

In the present invention, the at least one member selected from the group consisting of the homopolymers (a) and the copolymers (b) and (c) has a glass transition temperature in the range of preferably from −20° C. to +20° C., still more preferably from −10° C. to +10° C., particularly preferably from −10° C. to below −5° C. Namely, when one member selected from the group consisting of the homopolymers (a) and the copolymers (b) and (c) is used, it is preferable that the homopolymer or the copolymer used has a glass transition temperature falling within the above range, and when two or more members of them are used, it is preferable that the mixture of them exhibits a glass transition temperature falling within the above range. In this description, the glass transition temperatures (Tg, unit: °C.) of homopolymers (a) refer to their respective known values, while the glass transition temperatures of copolymers (b) and (c) refer to values obtained by converting the respective glass transition temperatures on the absolute scale ($Tg_p$, unit: °K) as calculated according to Fox's equation which will be described below into those on the centigrade scale (Tg, unit: °C.)

Fox's equation $$1/Tg_p = \sum_i (W_i/Tg_i)$$

wherein $Tg_p$ represents the grass transition temperature (unit: °K) of a copolymer; $w_i$ represents the weight fraction of monomer i based on all the monomers; and $tg_i$ represents the glass transition temperature (unit: °K) of the homopolymer of monomer i.

Tg (unit: °C.)=$Tg_p$ (unit: °K)−273

Thus, the glass transition temperature of the copolymer (b) or (c) can be adjusted to a desired value by regulating the kinds and proportions of starting monomers.

The use of a (co)polymer(s) having a glass transition temperature ranging from −20 to +20° C. can give an adhesive article which is well-balanced among blocking resistance, tack strength and initial tack. Among these properties, tack strength and initial tack can be improved also by using an increased amount of the plasticizer which will be described below. However, the use of an increased amount thereof lowers the holding power. Accordingly, it is preferable that the improvement in these properties be conducted by selecting the (co)polymer which constitutes the adhesive composition from the standpoint of glass transition temperature.

The (co)polymer to be used in the present invention can be produced according to a conventional emulsion or suspension polymerization process. The following process is a preferable example of the process for preparing the (co) polymer.

The process comprises an emulsification step and a polymerization step. In the emulsification step, monomers, water, an emulsifier and optionally a water-soluble polymer at need are used, and the monomers are dispersed in water at a temperature exceeding the melting points of the monomers to form an emulsion wherein the mean particle diameter of the disperse phase (the monomers) is 5 μm or below. In general, an ultrasonic homogenizer, or a continuous emulsifying apparatus such as Milder (a product of EBARA SEISAKUSHO Co. Ltd.) is used in this step. The emulsifier to be used in this step may be any of nonionic, cationic, anionic and amphoteric ones. Or alternatively, a radical-polymerizable emulsifier which is taken into the resulting polymer may be used. In the polymerization step, the emulsion prepared in the emulsification step is fed into a reactor for polymerization fitted with a stirrer, followed by the addition of a polymerization initiator. Then, the contents of the reactor are heated to a temperature suitable for the polymerization while stirring to conduct the polymerization. The polymerization initiator to be used in this step may be any water-soluble one which is used in a conventional emulsion polymerization, and specific examples thereof include persulfates such as potassium persulfate and ammonium persulfate; azo compounds such as 2,2'-azobis(2-amidinopropane) hydrochloride and azobis(cyanovaleric acid); and redox initiator systems such as combinations of organic hydroperoxides with ascorbic acid, those of organic hydroperoxides with iron ion, those of persulfates with sulfite salts, and that of hydrogen peroxide with iron ion.

The process for preparing the (co)polymer according to the present invention is not limited to the above process.

In the present invention, a plasticizer being solid at ordinary temperatures is used to plasticize the above (co) polymer at elevated temperatures. Examples of such a plasticizer include diphenyl phthalate, dihexyl phthalate, dicyclohexyl phthalate, dihydroabietyl phthalate, dimethyl isophthalate, sucrose monobenzoate, ethyleneglycol dibenzoate, glycerol tribenzoate, pentaerythritol tetrabenzoate, sucrose octaacetate, tricyclohexyl citrate and N-cyclohexyl-p-toluenesulfonamide, among which dicyclohexyl phthalate is preferable owing to its high general-purpose properties.

In the delayed-tack adhesive composition of the present invention, the weight ratio of the plasticizer to the (co) polymer is desirably 0.3 to 3, still more desirably 0.4 to 2.5, particularly desirably 0.5 to 2. It is needless to say that the weight ratio refers to that of the plasticizer itself to the (co)polymer itself. That is, even when the (co)polymer is provided in the form of, e.g., an emulsion, the weight of the emulsion (i.e., the total weight of the (co)polymer and other components) is not employed in calculating the weight ratio described above. Incidentally, when the (co)polymer is provided in the form of an emulsion, the content of the (co)polymer of the emulsion is often expressed in terms of the solid content thereof.

The delayed-tack adhesive composition of the present invention may further comprise a tackifier to regulate the tack performance of an adhesive article produced by the use of the composition. Examples of the tackifiers include terpene resins, aliphatic petroleum resins, aromatic petroleum resins, cumaroneindene resins, styrenic resins, phenolic resins, terpene-phenol resins and rosin derivative (such as rosin, polymerized rosin and hydrogenated rosin; esters of them with glycerol, pentaerythritol and the like; and resin acid dimers). The tackifier to be used is suitably selected in consideration of compatibility with the (co)polymer serving as adhesive component or the plasticizer. The amount of the tackifier to be used is desirably 50% by weight or below, still more desirably 5 to 40% by weight, particularly desirably 10 to 30% by weight, based on the weight of the (co)polymer it self. An adhesive article which is prepared by the use of an adhesive composition comprising a tackifier in such an amount has well-balanced properties including, in particular, various tack characteristics and blocking resistance.

In order to further improve the blocking resistance, the delayed-tack adhesive composition of the present invention may further contain an inorganic substance such as titanium oxide, alumina, colloidal silica, kaolin and talc, or an organic substance such as paraffin and powdery styrene, in addition to the above components. If necessary, the composition may also contain other additive(s) such as dispersants, anti-foaming agents, thickeners and surfactants.

Although the process for preparing the adhesive composition of the present invention is not limited at all, examples thereof include one which comprises adding a dispersion or emulsion containing the plasticizer and the tackifier to an emulsion comprising the (co)polymer; and one which comprises dissolving the plasticizer and the tackifier in an emulsion of the monomer(s) and adding a polymerization initiator to the emulsion thus obtained to (co)polymerize the monomer(s) as such.

Representative forms of the thus-prepared adhesive composition of the present invention include an emulsion and an emulsion/suspension. A substrate, for example, paper such as woodfree paper, single-coated paper and double-coated paper, or a film made of plastics such as polyester and polyolefin is uniformly coated with the adhesive composition taking such a form to be formed an adhesive composition layer; and then the adhesive composition layer is dried to give a coated article (adhesive article of the present invention) comprising a substrate layer and a non-tacky adhesive layer (formed by drying the adhesive composition layer). Specific examples of the forms of the adhesive article include tack labels, sheets and tapes.

Although the thickness of the substrate layer is not particularly limited but varies depending on the use application of the adhesive article, it is generally about 10 to 5000 μm.

For coating the substrate with the adhesive composition, any of known methods such as one using a bar coater and gravure coating method can be employed. The thickness of the adhesive composition layer is generally about 20 to 200 μm, though it varies depending on the kind and sizes of the substrate and the use application of the adhesive article.

For drying the adhesive composition layer, conditions by which the adhesive layer does not develop tack after drying and no adverse effect is exerted on the substrate are selected. For example, a method comprising blowing hot air at a temperature not exceeding the melting point of the plasticizer toward the adhesive composition layer to thereby dry the layer sufficiently may be preferably employed. The thickness of the adhesive layer is generally about 10 to 150 μm, though it varies depending on the kind and sizes of the substrate and the use application of the adhesive article.

The adhesive layer of the adhesive article according to the present invention is non-tacky, as far as it exists as such. Just before the use, the adhesive article is subjected to activation (tack development of the adhesive layer). This activation may be conducted just before the use of the adhesive article by heating the adhesive layer (with, e.g., hot air at a temperature higher than the melting point of the plasticizer) under such conditions that the plasticizer is molten, though the method of the activation is not particularly limited. The adhesive layer of the adhesive article of the present invention develops tack for an adherend such as plastic cases through such the activation process. Therefore, the article is sometimes called also "heat-sensitive adhesive".

As described above, the present invention provides a delayed-tack adhesive article which exhibits excellent tack not only for polar materials such as glass and stainless steel to which the delayed-tack adhesive articles of the prior art were satisfactorily applicable, but also for non-polar materials such as polyethylene; and a delayed-tack adhesive composition useful for the production of the adhesive article. Accordingly, new uses of delayed-tack adhesive articles wherein plastic bottles and the like are employed as the adherends are developed by the present invention. Further, the adhesive article of the present invention is well balanced among tack strength, holding power and initial tack. Furthermore, since the adhesive article of the present invention is excellent also in blocking resistance, the article can be composed of only an adhesive layer and a substrate layer. In other words, a release paper can be dispensed with. Accordingly, the adhesive article of the present invention is more advantageous than that, such as a tack label, of the prior art comprising a release paper as an essential member in cost.

EXAMPLE

The present invention will now be described in detail by referring to the following Examples by which the present invention is not limited.

In the following Examples, all parts and percentages are by weight.

Example 1

(1) Preparation of Thermoplastic Copolymer Emulsion 50 parts of lauryl methacrylate, 50 parts of styrene, 9 parts of Levenol WZ [anionic surfactant of Kao Corporation, sodium salt of poly(18)oxyethylene nonylphenyl ether sulfate, active ingredient content: 25%] and 141 parts of deionized water were put in a 500-ml beaker. The resulting mixture was emulsified by the use of an ultrasonic homogenizer (mfd. by Nippon Seiki Seisaku-sho) for 15 minutes while stirring to prepare a monomer emulsion. The air in a 500-ml separable flask fitted with a reflux condenser, a stirring rod and a thermometer was purged with nitrogen, and the above monomer emulsion was put in the flask. Then, the resulting flask was put on an oil bath. The temperature of the oil bath was raised, while the emulsion was stirred by the use of a stirring motor. At the point of time when the temperature of the emulsion reached 70° C., 4 parts of a 10% aqueous solution of t-butyl hydroperoxide and 4 parts of a 10% aqueous solution of L-(+)-ascorbic acid were added to the emulsion in this order. Thereafter, the temperature of the resulting mixture was maintained at 80° C. for 4 hours to conduct copolymerization.

The $Tg_i$'s of lauryl methacrylate homopolymer and styrene homopolymer are 208° K and 373° K respectively (on the authority of POLYMER HANDBOOK 2nd Ed.).

(2) Preparation of Plasticizer Dispersion 100 parts of dicyclohexyl phthalate (DCHP) which is a plasticizer being solid at ordinary temperatures, 100 parts of a 10% aqueous solution of Polyvinyl alcohol GL-03 as the dispersant (a product of Nippon Synthetic Chemical Industry, Co., Ltd.) and 50 parts of deionized water were put in a ball mill, followed by pulverization of the DCHP in 24 hours. The resulting mixture was dispersed in deionized water to prepare a plasticizer dispersion (suspension).

(3) Preparation of Emulsion/Suspension Type Adhesive Composition 250 parts of the thermoplastic copolymer emulsion prepared above was mixed with 250 parts of the above plasticizer dispersion [at a copolymer/plasticizer weight ratio (in terms of solid matter) of 1/1] to prepare a uniform emulsion/suspension type adhesive composition (Sample 1).

(4) Production of Filmy Adhesive Article and Evaluation Thereof

One surface of a polyethylene terephthalate film (thickness: 38 μm) which had preliminarily been subjected to corona discharge treatment was coated with Sample 1 by the use of a bar coater to be a thickness of Sample 1 of 75 μm. The resulting film was dried at 40° C. in a hot-air drying chamber for 5 minutes to give a delayed-tack adhesive article having a 30 μm thick adhesive layer (the coating weight of the adhesive layer: 30 g/m$^2$). The adhesive article thus produced was evaluated for performances such as tack characteristics by the following methods.

Evaluation Methods for Performances

Tack Strength

The adhesive article was cut in a width of 20 mm. The obtained test piece was heated with hot air at 80° C. for 5 seconds to develop the tack of the adhesive layer. Immediately, the resulting test piece was stuck on a preliminarily cleaned test plate made of high-density polyethylene. The specimen thus prepared was examined for tack strength by the testing method for tack strength (180° C. peeling test) according to JIS Z 0237 (1991).

Holding Power

The same procedure as described in the above test on tack strength was repeated until the development of tack. Immediately after the completion of the heating, the resulting test piece (adhesive article) was stuck on a plate made of stainless steel. The length and width of the stuck area of the test piece were 20 mm and 25 mm, respectively. The specimen thus prepared was examined for holding power by the testing method for holding power according to JIS Z 0237 (1991) at 50° C. under a load of 500 g.

In the case wherein the test piece fell within one hour after the initiation of the test, the time which had elapsed until the falling was measured, while in the case wherein the test piece did not fall within one hour thereafter, the deviation of the test piece was measured.

Initial Tack

The same procedure as described in the above test on tack strength was repeated until the development of tack. Then, the resulting adhesive article was examined by the ball tack method according to JIS Z 0237 (1991) at an angle of inclination of 30°. The value (ball tack) thus determined was taken as the initial tack of the article.

Blocking Resistance

Two adhesive articles before the development of tack (i.e., before the treatment with hot air at 80° C.) were piled up with the adhesive layers being faced to each other. The resulting laminate was allowed to stand at 50° C. under a load of 500 g/cm² for 30 minutes. Thereafter, the two adhesive articles were peeled from each other by hand to evaluate the blocking resistance according to the following criteria:

⊚: no resistance to peeling
○: slight resistance to peeling
Δ: resistance to peeling to some extent, and
X: considerable resistance to peeling The results are given in Table 1 together with the glass transition temperature (calculated) of the thermoplastic copolymer prepared above.

Example 2

Copolymerization was effected in the same formulation and same process as those of Example 1 to prepare a thermoplastic copolymer emulsion. 200 parts of a plasticizer (DCHP) dispersion prepared by the same process as that of Example 1 and 50 parts of an emulsion (solid content: 50%) of a rosin ester tackifier were added to 250 parts of the thermoplastic copolymer emulsion prepared above, followed by mixing. Thus, a uniform emulsion/suspension type adhesive composition (Sample 2) was prepared.

In a similar manner to that of Example 1, an adhesive article was produced by the use of Sample 2, and evaluated for performances.

The results are given in Table 1.

Example 3

Another adhesive composition (Sample 3) was prepared in the same manner as that of Example 1 except that 40 parts of lauryl methacrylate, 20 parts of stearyl methacrylate, 38 parts of styrene and 2 parts of methacrylic acid were used as the starting monomers in the preparation of a thermoplastic copolymer emulsion.

In a similar manner to that of Example 1, an adhesive article was produced by the use of Sample 3, and evaluated for performances.

The results are given in Table 1 together with the glass transition temperature (calculated) of the thermoplastic copolymer prepared above.

The $Tg_i$'s of stearyl methacrylate homopolymer and methacrylic acid homopolymer are 311° K (on the authority of the catalogue of products of Shoeisha Kagaku, K.K.) and 501° K (on the authority of POLYMER HANDBOOK 2nd Ed.) respectively.

Example 4

Another adhesive composition (Sample 4) was prepared in the same manner as that of Example 1 except that 50 parts of decyl methacrylate and 50 parts of styrene were used as the starting monomers in the preparation of a thermoplastic copolymer emulsion.

In a similar manner to that of Example 1, an adhesive article was produced by the use of Sample 4, and evaluated for performances.

The results are given in Table 1 together with the glass transition temperature (calculated) of the thermoplastic copolymer prepared above.

The $Tg_i$ of decyl methacrylate homopolymer is 203° K (on the authority of POLYMER HANDBOOK 2nd Ed.).

Example 5

Another adhesive composition (Sample 5) was prepared in the same manner as that of Example 2 except that 40 parts of lauryl methacrylate, 20 parts of stearyl methacrylate and 40 parts of styrene were used as the starting monomers in the preparation of a thermoplastic copolymer emulsion.

In a similar manner to that of Example 1, an adhesive article was produced by the use of Sample 5, and evaluated for performances.

The results are given in Table 1 together with the glass transition temperature (calculated) of the thermoplastic copolymer prepared above.

Comparative Example 1

An emulsion (solid content: 40%) of EVA (ethylene-vinyl acetate copolymer) was used as the thermoplastic copolymer emulsion. 250 parts of the EVA emulsion was mixed with 250 parts of a DCHP dispersion prepared by the same process as that of Example 1 to form a uniform emulsion/suspension type adhesive composition (Sample 6). In a similar manner to that of Example 1, an adhesive article was produced by the use of Sample 6, and evaluated for performances.

The results are given in Table 1 together with the glass transition temperature (calculated) of the thermoplastic copolymer used (i.e., ethylene-vinyl acetate copolymer).

Comparative Example 2

Another adhesive composition (Sample 7) was prepared in the same manner as that of Example 1 except that 50 parts of 2-ethylhexyl acrylate and 50 parts of styrene were used as the starting monomers in the preparation of a thermoplastic copolymer emulsion.

In a similar manner to that of Example 1, an adhesive article was produced by the use of Sample 7, and evaluated for performances.

The results are given in Table 1 together with the glass transition temperature (calculated) of the thermoplastic copolymer prepared above.

The $Tg_i$ of 2-ethylhexyl acrylate homopolymer is 223° K (on the authority of POLYMER HANDBOOK 2nd Ed.).

Comparative Example 3

A thermoplastic copolymer emulsion was prepared in the same manner as that of Example 1 except that 50 parts of 2-ethylhexyl acrylate and 50 parts of styrene were used as the starting monomers. 250 parts of the obtained emulsion was mixed with 200 parts of a DCHP dispersion prepared by the same process as that of Example 1 and 50 parts of a rosin ester tackifier emulsion (solid content: 50%) to form a uniform emulsion/suspension type adhesive composition (Sample 8). In a similar manner to that of Example 1, an adhesive article was produced by the use of Sample 8, and evaluated for performances.

The results are given in Table 1 together with the glass transition temperature (calculated) of the thermoplastic copolymer prepared above.

Comparative Example 4

Another adhesive composition (Sample 9) was prepared in the same manner as that of Example 1 except that 50 parts of octyl acrylate and 50 parts of styrene were used as the starting monomers in the preparation of a thermoplastic copolymer emulsion.

In a similar manner to that of Example 1, an adhesive article was produced by the use of Sample 9, and evaluated for performances.

The results are given in Table 1 together with the glass transition temperature (calculated) of the thermoplastic copolymer prepared above.

The $Tg_i$ of octyl acrylate homopolymer is 208° K (on the authority of POLYMER HANDBOOK 2nd Ed.).

the starting monomers in the preparation of a thermoplastic copolymer emulsion.

In a similar manner to that of Example 1, an adhesive article was produced by the use of Sample 12, and evaluated for performances.

The results are given in Table 2 together with the glass transition temperature (calculated) of the thermoplastic copolymer prepared above.

Example 9

Another adhesive composition (Sample 13) was prepared in the same manner as that of Example 1 except that 80 parts of lauryl methacrylate and 20 parts of styrene were used as the starting monomers in the preparation of a thermoplastic copolymer emulsion.

In a similar manner to that of Example 1, an adhesive article was produced by the use of Sample 13, and evaluated for performances.

The results are given in Table 2 together with the glass transition temperature (calculated) of the thermoplastic copolymer prepared above.

TABLE 1

|  | Ex. | | | | | Comp. Ex. | | | |
| --- | --- | --- | --- | --- | --- | --- | --- | --- | --- |
|  | 1 | 2 | 3 | 4 | 5 | 1 | 2 | 3 | 4 |
| Tg (calcd.) [° C.] | −6 | −6 | 3 | −10 | 2 | 0 | 6 | 6 | −6 |
| 180° peel strength [gf/20 mm] | 700 | 900 | 600 | 650 | 650 | 400 | 450 | 500 | 400 |
| Initial tack [No.] | 4 | 6 | 4 | 6 | 5 | <2 | 6 | 8 | 2 |
| Holding power [min] | 15 | 30 | 30 | 15 | 30 | <5 | <5 | 5 | <5 |
| Blocking resistance | ⊚ | ○ | ⊚ | ○ | ○ | ○ | Δ | X | Δ |

Example 6

Another adhesive composition (Sample 10) was prepared in the same manner as that of Example 1 except that 20 parts of lauryl methacrylate and 80 parts of styrene were used as the starting monomers in the preparation of a thermoplastic copolymer emulsion.

In a similar manner to that of Example 1, an adhesive article was produced by the use of Sample 10, and evaluated for performances.

The results are given in Table 2 together with the glass transition temperature (calculated) of the thermoplastic copolymer prepared above.

Example 7

Another adhesive composition (Sample 11) was prepared in the same manner as that of Example 1 except that 35 parts of lauryl methacrylate and 65 parts of styrene were used as the starting monomers in the preparation of a thermoplastic copolymer emulsion.

In a similar manner to that of Example 1, an adhesive article was produced by the use of Sample 11, and evaluated for performances.

The results are given in Table 2 together with the glass transition temperature (calculated) of the thermoplastic copolymer prepared above.

Example 8

Another adhesive composition (Sample 12) was prepared in the same manner as that of Example 1 except that 60 parts of lauryl methacrylate and 40 parts of styrene were used as Example 10

Another adhesive composition (Sample 14) was prepared in the same manner as that of Example 1 except that the amount of the plasticizer dispersion was changed to 125 parts.

In a similar manner to that of Example 1, an adhesive article was produced by the use of Sample 14, and evaluated for performances.

The results are given in Table 2 together with the glass transition temperature (calculated) of the thermoplastic copolymer prepared above.

Example 11

Another adhesive composition (Sample 15) was prepared in the same manner as that of Example 1 except that the amount of the plasticizer dispersion was changed to 500 parts.

In a similar manner to that of Example 1, an adhesive article was produced by the use of Sample 15, and evaluated for performance.

The results are given in Table 2 together with the glass transition temperature (calculated) of the thermoplastic copolymer prepared above.

Example 12

Another adhesive composition (Sample 16) was prepared in the same manner as that of Example 1 except that 100 parts of hexadecyl methacrylate was used as the starting monomer in the preparation of a thermoplastic copolymer emulsion.

In a similar manner to that of Example 1, an adhesive article was produced by the use of Sample 16, and evaluated for performances.

The results are given in Table 2 together with the glass transition temperature (on the authority of POLYMER HANDBOOK 2nd Ed.) of hexadecyl methacrylate homopolymer.

TABLE 2

|  | Ex. | | | | | | |
|---|---|---|---|---|---|---|---|
|  | 6 | 7 | 8 | 9 | 10 | 11 | 12 |
| Tg (calcd.) [° C.] | 49 | 19 | −20 | −45 | −6 | −6 | 15 |
| 180° peel strength [gf/20 mm] | 300 | 600 | 600 | 300 | 600 | 900 | 600 |
| Initial tack [No.] | 2 | 4 | 6 | 6 | 4 | 6 | 4 |
| Holding power (min) | 40 | 20 | 10 | 5 | 30 | 10 | 25 |
| Blocking resistance | ◎ | ◎ | ○ | ○ | ○ | ◎ | ◎ |

As is apparent from the above results, the delayed-tack adhesive articles prepared by the use of the adhesive compositions of the present invention exhibit well-balanced tack characteristics (including adhesive strength, initial tack and holding power), while those prepared by the use of the adhesive compositions of Comparative Examples lack in one or more of these characteristics and exhibit imbalanced performance. Further, the delayed-tack adhesive articles according to the present invention are superior to those of Comparative Examples also in blocking resistance.

We claim:

1. A delayed-tack adhesive composition comprising at least one thermoplastic polymer selected from the group consisting of (a) homopolymers each prepared from a radical-polymerizable monomer having a straight-chain or branched alkyl group having 9 to 18 carbon atoms, (b) copolymers each prepared from at least two radical-polymerizable monomers each having a straight-chain or branched alkyl group having 9 to 18 carbon atoms and (c) copolymers each prepared from at least one radical-polymerizable monomer having a straight-chain or branched alkyl group having 9 to 18 carbon atoms and at least one monomer copolymerizable therewith, and a plasticizer being solid at ambient temperatures.

2. The delayed-tack adhesive composition according to claim 1, wherein said at least one thermoplastic polymer selected from the group consisting of the homopolymers (a) and the copolymers (b) and (c) has a glass transition temperature (Tg) falling within the range of from −20° C. to +20° C.

3. The delayed-tack adhesive composition according to claim 1, wherein said radical-polymerizable monomer having a straight-chain or branched alkyl group having 9 to 18 carbon atoms is an ester of (meth)acrylic acid with a monohydric alcohol having a straight-chain alkyl group having 9 to 18 carbon atoms.

4. The delayed-tack adhesive composition according to claim 1, wherein said at least one thermoplastic polymer selected from the group consisting of the homopolymers (a) and the copolymers (b) and (c) is at least one member selected among the copolymers (c).

5. The delayed-tack adhesive composition according to claim 4, wherein the copolymer (c) used is one prepared by copolymerizing 30 to 70% by weight of at least one radical-polymerizable monomer having a straight-chain or branched alkyl group having 9 to 18 carbon atoms and 70 to 30% by weight of at least one monomer copolymerizable therewith, each percentage being based on the total weight of the monomers.

6. The delayed-tack adhesive composition according to claim 1, wherein the weight ratio of said plasticizer being solid at ambient temperatures to said at least one thermoplastic polymer selected from the group consisting of the homopolymers (a) and the copolymers (b) and (c) is within the range of 0.3 to 3.

7. The delayed-tack adhesive composition according to claim 1, which further comprises a tackifier.

8. A delayed-tack adhesive article comprising a substrate layer and an adhesive layer formed thereon comprising the delayed-tack adhesive composition according to claim 1.

9. A processing for preparing a delayed-tack adhesive article comprising the steps:

coating a substrate with a delayed-tack adhesive composition, which comprises at least one member selected from the group consisting of (a) homopolymers each prepared from a radical-polymerizable monomer having a straight-chain or branched alkyl group having 9 to 18 carbon atoms, (b) copolymers each prepared from at least two radical-polymerizable monomers each having a straight-chain or branched alkyl group having 9 to 18 carbon atoms and (c) copolymers each prepared from at least one radical-polymerizable monomer having a straight-chain or branched alkyl group having 9 to 18 carbon atoms and at least one monomer copolymerizable therewith, and a plasterizer being solid at ambient temperatures, thereby obtaining an adhesive composition layer, and drying the adhesive composition layer.

10. The process according to claim 9, wherein the delayed-tack adhesive article is one which is applied to an adherend made to a non-polar material.

11. A process for preparing a delayed-tack adhesive composition, which comprises bringing together at least one member selected from the group consisting of (a) homopolymers each prepared from a radical-polymerizable monomer having a straight-chain or branched alkyl group having 9 to 18 carbon atoms, (b) copolymers each prepared from at least two radical-polymerizable monomers each having a straight-chain or branched alkyl group having 9 to 18 carbon atoms and (c) copolymers each prepared from at least one radical-polymerizable monomer having a straight-chain or branched alkyl group having 9 to 18 carbon atoms and at least one monomer copolymerizable therewith and a plasticizer being solid at ambient temperatures.

* * * * *